Figure 1:
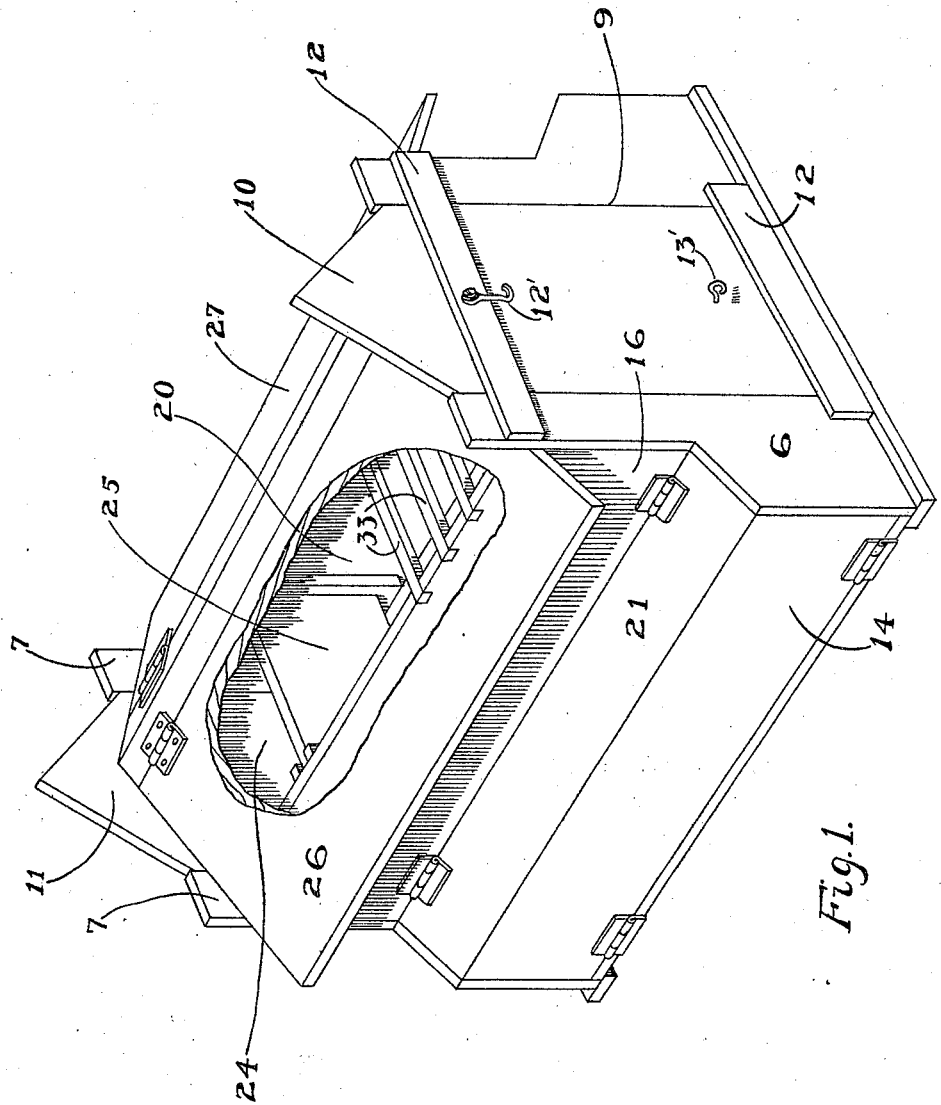

Dec. 19, 1922.

A. FORD.
COMBINATION HOG BROODER AND FEEDER.
FILED NOV. 12, 1921.

1,439,157

Witnesses:
R. T. Moore.

Inventor:
Arthur Ford,
By
His Attorney.

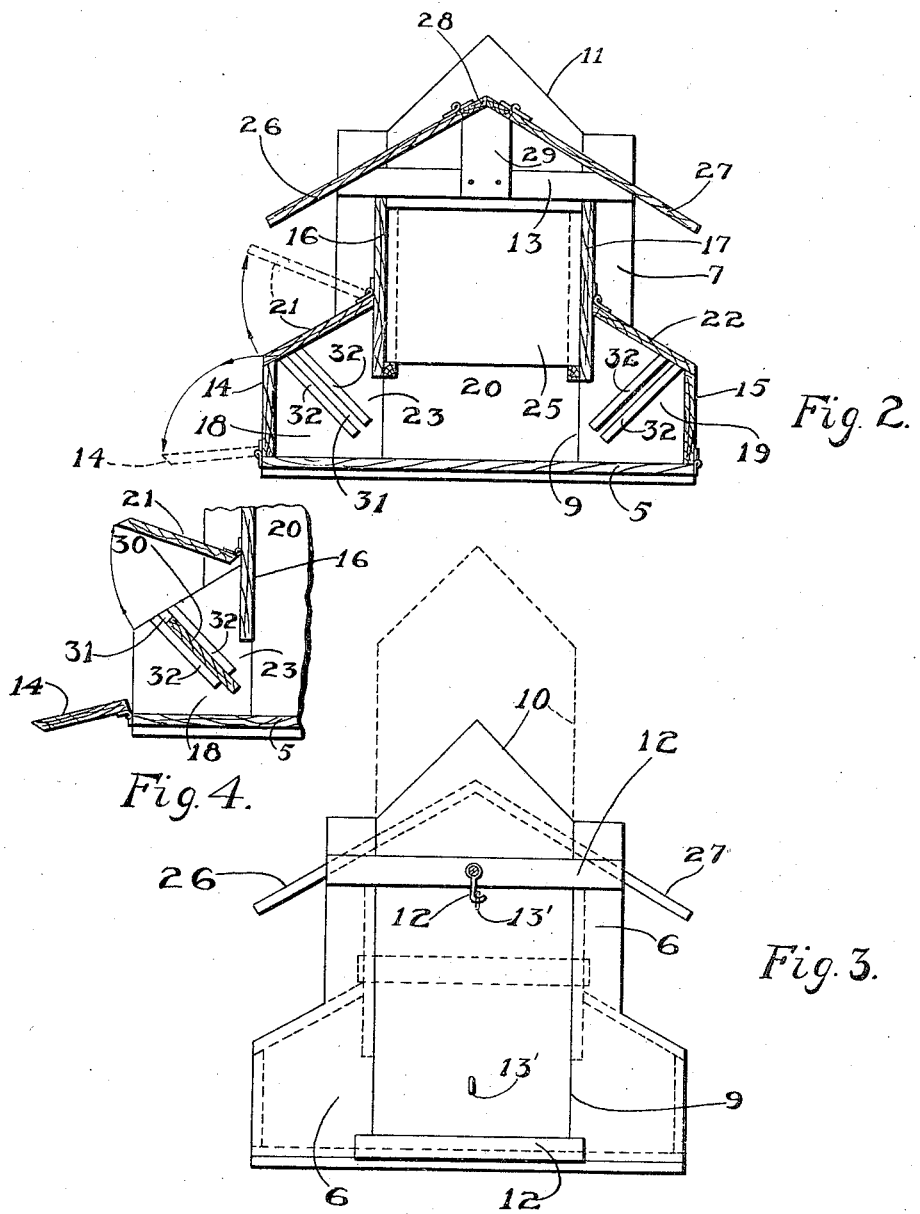

Patented Dec. 19, 1922.

1,439,157

UNITED STATES PATENT OFFICE.

ARTHUR FORD, OF GALESBURG, ILLINOIS.

COMBINATION HOG BROODER AND FEEDER.

Application filed November 12, 1921. Serial No. 514,631.

*To all whom it may concern:*

Be it known that I, ARTHUR FORD, a citizen of the United States, and a resident of the city of Galesburg, county of Knox, and State of Illinois, have invented certain new and useful Improvements in a Combination Hog Brooder and Feeder, of which the following is a specification.

My invention relates to new and useful improvements in a combination hog brooder and feeder and has for its principal object the provision of a construction of this character which will be highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a perspective view of my combination hog brooder and feeder, Fig. 2 is a vertical sectional view of the same, Fig. 3 is an end elevational view of the same, and Fig. 4 is a fragmentary vertical cross sectional detail view of the same when used as a feeder.

The purpose of my invention is to provide a hog brooder which will protect the pigs from being tramped or laid on by the sow, and to provide a brooder which, when the brooding season is over, can be converted into a feeder.

In carrying out my invention I provide a hog brooder comprising a base member 5 and end walls 6 and 7. The end walls are provided with doorways 8 and 9, through which the sow is led into the brooder during the brooding season, and which consist of vertically sliding doors 10 and 11, slidably mounted between horizontally extending strips 12 and 13, and held in an open position by hook members 12' and 13'. The lower half of the side walls of the brooder consist of a pair of oppositely disposed side walls 14 and 15 which are hingedly secured to the side edges of the base member 5. The upper side wall portions 16 and 17 of a brooder are fixedly secured to the end walls 6 and 7. By referring to the drawings it will be noted that the lower side walls 14 and 15 are located outwardly from the upper side wall portions 16 and 17, to provide alleyways 18 and 19 on each side of the main section 20 of the brooder. The roofs 21 and 22 between the lower side wall portions and the upper side wall portions are hingedly secured to the upper side wall portions 16 and 17 about the center thereof, as clearly shown in Figs. 2 and 4 of the drawings. The lower ends of the upper side wall portions 16 and 17 extend downwardly into the brooder, as shown in Fig. 2, so as to provide an opening 23 between the main section 20 of the brooder and the alleyways 18 and 19. This arrangement is such that the lower ends of the upper side wall portions serve as a partition dividing the main section 20 of the brooder from the alleyways 18 and 19, at the same time leaving an opening, as stated, large enough for the pigs to scamper back into the alleyways from the main brooder 20. The purpose of providing alleyways on each side of the brooder, as shown in Fig. 2 of the drawings, is to allow the pigs, when the sow is in the brooder during the brooding season, to be able to run from one side of the brooder to the other. The two side alleyways are connected together at one end of the brooder by an end alleyway 24 which is separated from the main section or stall 20 of the brooder by a vertically sliding door 25 of any suitable construction. The roof of the main section of the brooder comprises roof members 26 and 27 hingedly secured to a main ridge 28 which is removably supported by a vertically extending support 29 secured at each end of the brooder to the horizontally extending strip 13. This arrangement is such that when the brooding season is over the roof may be entirely removed or the roof members 26 and 27 may be swung open to permit filling the brooder with feed for the hogs.

When the brooder is used as a feeder, the hingedly mounted side walls 14 and 15 and the hingedly mounted roofs 21 and 22 are swung open to permit the hogs to have access to the feed, which flows through the opening 23 from the main section 20 of the brooder. In order to regulate the flow of feed, I have provided oppositely disposed downwardly and inwardly extending gate members 30 which are slidably mounted in a groove 31 between guide members 32 which are secured to the end walls 6 and 7, as shown in Fig. 5 of the drawings. The said gate members 30 are removed during the brooding season.

When my invention is used for brooding the sow is led through the outer doorway 11, past the slidably mounted partition 25 into the main section 20 of the brooder; the size of the brooder being such that the sow cannot turn around, thereby avoiding unnecessary tramping on the pigs. To prevent the sow from lifting the main roof with the forepart of its body, I have secured to the top edges of the upper side wall portions, a number of strips 33 equally spaced apart. During the brooding season the pigs have access to either side of the brooder through the alleyways, herein mentioned, which serve as a protection for the pigs when the sow lies down, thus preventing the sow from lying on the pigs.

In a combination brooder and feeder, as herein set forth, it will be evident that the pigs, during the brooding season, have plenty of running space and are protected against injury which might be inflicted by the sow. The feeder as herein described will be of great advantage to the farmer, avoiding the necessity of being obliged to constantly give feed to his hogs as he would have to do otherwise.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. In a combination brooder and feeder comprising end and side walls; a main stall in said brooder, there being an alleyway at each side of said main stall; a hingedly mounted roof removably supported by the end walls of said brooder in spaced relation with respect to the upper edges of the side walls thereof; and transverse members carried on the upper edges of said side walls in spaced relation with respect to each other to prevent the removal of said roof by the occupant of said brooder, substantially as described.

2. In a combination brooder and feeder comprising end and side walls, said side walls comprising upper and lower wall portions, said lower wall portions being located outwardly beyond the upper wall portions and the lower ends of the upper wall portions being extended downwardly into said brooder; a main stall in said brooder; alleyways at each side of said main stall; roofs over each of said alleyways, said roofs being hingedly connected to the upper wall portions and resting on the upper edges of the lower wall portions; and a roof over said main stall, said roof comprising parts hingedly connected together and supported in spaced relation with respect to the upper edges of said side wall portions to permit the admission of air into said brooder, and transverse members carried by the upper side wall portions to prevent the removal of the roof over the main stall by the occupant of said brooder, substantially as described.

3. In a combination brooder and feeder comprising a base, end and side walls, the lower portions of said side walls being hingedly connected to said base and located outwardly from the upper portions of said side walls; roof supports carried by the said end walls, a roof removably carried by said supports, said roof comprising parts hingedly connected together and supported in spaced relation with respect to the upper edges of the upper side wall portions for the admission of air into said brooder; and transverse members carried by the upper side wall portions to prevent the removal of said roof by the occupant of said brooder; a main stall in said brooder; alleyways at each side of said main stall; a transverse partition removably mounted in said main stall to form an end alleyway communicating with the said side alleyways; and door openings leading into said end alleyway and said main stall, substantially as described.

4. In a combination brooder and feeder comprising end and side walls, said side walls comprising upper and lower portions, said lower portions being located outwardly beyond said upper wall portions and hingedly connected to the floor of said brooder; roof members carried by said upper wall portions and resting on the top edges of the lower side wall portions, said lower wall portions and said roof being opened when said brooder is used as a feeder; roof supports carried by the end walls of said brooder; a removable roof carried by said roof supports; and transverse members carried by the upper wall portions to prevent the removal of said roof by the occupant of said brooder.

In testimony whereof I have signed my name to this specification in the presence of two subscribing witnesses.

ARTHUR FORD.

Witnesses:
HELEN R. JOHNSON,
N. P. ANDERSON.